Figure 1:
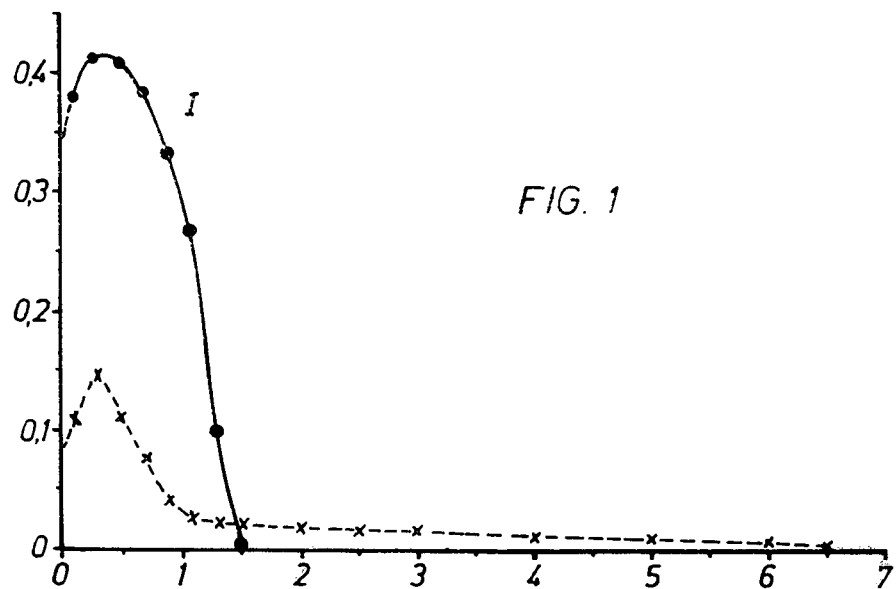

# United States Patent [19]
Kroebel et al.

[11] 3,960,762
[45] June 1, 1976

[54] PRODUCTION OF ABSORBENTS
[75] Inventors: Reinhard Kroebel, Kaarst; Alfred Meyer, Cologne, both of Germany
[73] Assignee: Bayer Aktiengesellschaft, Germany
[22] Filed: Aug. 9, 1974
[21] Appl. No.: 496,107

Related U.S. Application Data
[63] Continuation of Ser. No. 314,754, Dec. 13, 1972, abandoned.

[30] Foreign Application Priority Data
Dec. 18, 1971 Germany............................ 2162951

[52] U.S. Cl............................. 252/426; 210/31 C
[51] Int. Cl.² ........................................ B01D 15/08
[58] Field of Search............... 252/426; 260/29.1 R, 260/30.6 R

[56] References Cited
UNITED STATES PATENTS
3,637,535   1/1972   Corte et al........................... 260/2.1

OTHER PUBLICATIONS

Eschrich et al., "Extraction Chromatography," June, 1971, Eurochemic Technical Report ETR–271.

*Primary Examiner*—Patrick P. Garvin
*Attorney, Agent, or Firm*—Connolly and Hutz

[57]         ABSTRACT

Process of adding an extractant, an extractant mixture or a solution of an extractant in a solution promoter to a mixture of a monomeric monovinyl compound and a polyvinyl compound and polymerizing the resulting mixture in the presence of a free radical catalyst, the extractant, the extractant mixture and the solution of the extractant in the solution promoter being a solvent for the monomers but not for the polymer resulting therefrom and resultant absorbent useful as the stationary phase in extraction chromatography.

33 Claims, 2 Drawing Figures

PRODUCTION OF ABSORBENTS

CROSS REFERENCE TO RELATED APPLICATION

This application is a continuation of application Ser. No. 314,754 filed Dec. 13, 1972 and now abandoned.

Eschrich H. and Drent W. in Extraction Chromatography Eurochemmic Technical Report ETR-271 (June 1971) describes the use of absorbents consisting of a supporting material and of an extractant or extractant mixture, as the stationary phase in extraction chromatography, the extractant or extractant mixture being capable of interaction with ions or molecules. Also Beranova H. and Novak M. in Coll. Zech. Chem. Comm. 30 1073–81 (1965), describe the use of synthetic resins, for example, macroporous copolymers of styrene and divinyl benzene, as supporting materials to which the extractant is applied by impregnating the copolymer with the extractant.

The disadvantage of absorbents to which the extractant is applied by impregnation is that the extractant is released too quickly to the mobile phase and, for this reason, such extractants have only a short effective life. Also, the elution curves of absorbents such as these show undesirable tail formation.

It has now been found that absorbents based on synthetic resins which do not have any of the disadvantages referred to above can be obtained by adding an extractant, an extractant mixture or a solution of an extractant, in a solution promoter to a mixture to be polymerised comprising monomeric monovinyl and polyvinyl compounds, the extractant, the extractant mixture or the solution of the extractant in a solution promoter representing a solvent for the monomeric monovinyl and polyvinyl compounds, but not for the polymer; and by carrying out the polymerisation reaction in the presence of the extractant, the extractant mixture or a solution of the extractant in a solution promoter. When absorbents are prepared in this way, the extractant or the extractant mixture is included in the polymer. All monovinyl- and polyvinyl compounds can be used in the present invention.

The following are examples of suitable monovinyl compounds: styrene, methylstyrene, acrylic acid, methacrylic acid, acrylonitrile, acrylic esters, methacrylic esters, vinyl anisole, vinyl naphthalene, methyl acrylate, ethyl acrylate, propyl acrylate, isopropyl acrylate, butyl acrylate, tert.-butyl acrylate, ethylhexyl acrylate, cyclo-hexyl acrylate, isobornyl acrylate, benzyl acrylate, phenyl acrylate, alkyl phenyl acrylates, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, ethylmethacrylate, propylmethacrylate, isopropylmethacrylate, butylmethacrylate, tert.-butylmethacrylate, ethylhexylmethacrylate, cyclohexyl methacrylate, isobornylmethacrylate, benzylmethacrylate, phenymethacrylate, alkylphenylmethacrylate, ethoxymethyl methacrylate, ethoxyethylmethacrylate, ethoxypropylmethacrylate, propoxymethylmethacrylate, propoxyethylmethacrylate, propoxypropylmethacrylate, ethoxyphenylmethacrylate, ethoxybenzylmethacrylate, ethylene, propylene, isobutylene, diisobutylene, vinyl toluene, vinyl chloride, vinyl acetate and vinylidene chloride. Polyethylenically unsaturated monomers, such as isoprene, butadiene and chlorprene, which generally behave as if they had only one double bond, are also suitable. Other suitable monovinyl compounds include heterocyclic monovinyl compounds, such as vinyl pyridine, 2-methyl-5-vinyl pyridine, 2-ethyl-5-vinyl pyridine, 3-methyl-5-vinyl pyridine, 2,3-dimethyl-5-vinyl pyridine, 2-methyl-3-ethyl-vinyl pyridine, 2-methyl-5-vinyl quinoline, 4-methyl-4-vinyl quinoline, 1-methyl- or 3-methyl-5-vinyl isoquinoline.

The following are mentioned as examples of polyvinyl compounds: divinyl benzene, divinyl pyridine, divinyl toluene, divinyl naphthalenes, diallyl phthalate, ethylene glycol diacrylate, ethylene glycol dimethacrylate, divinyl xylene, divinylethyl benzene, divinyl sulphone, polyvinyl- oor polyallyl ethers of glycol, glycerin and pentaerythritol, divinyl ketone, divinyl sulphide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallylaconitate, triallylcitrate, triallylphosphate, N,N′-methylene diacrylamide, N,N′-methylene dimethacrylamide, N,N′-ethylene diacrylamide, 1,2-di-(α-methylmethylene sulphonamido)-ethylene, trivinyl benzene, trivinyl naphthalene and polyvinyl anthracenes. The quantities in which the polyvinyl compounds are used can fluctuate within wide limits. In general, the polyvinyl compound content is within the range from 5 to 70 % by weight, based on the total quantity of monomer, contents of from 8 to 60% by weight, being preferred.

Suitable extractants include any of the compounds commonly used as extractants in extraction chromatography. A summary of these compounds can be found in Extraction Chromatography by H. Eschrich and W. Drent, Eurochemic Technical Report ETR-271 (June 1971). These extractants are substances from a variety of different classes of compounds such as esters, particularly acid and neutral esters of the acids of phosphorus, also sulphides, oxides, aliphatic and aromatic sulphoxides, amino oxides, phosphino oxides and arsinoxides; also primary, secondary and tertiary amines and ammonium and sulphonium salts, as well as ketones, ethers, carboxylic acids, sulphonic acids, mercaptanes, oximes, lactams, hydroxylamines, quinolines and pyrazoles. The following are mentioned as examples of esters of the acids of phosphorus: dibutylphosphate, diamylphosphate, dipentylphosphate, dihexylphosphate, diheptylphosphate, dioctylphosphate, dinonylphosphate, didecylphosphate, diundecylphosphate, didodecylphosphate, ditridecylphosphate, ditetradecylphosphate, dipentadecylphosphate, dihexadecylphosphate, butylamylphosphate, butylhexylphosphate, butyloctylphosphate, hexyl laurylphosphate, tributylphosphate, triamylphosphate, trihexylphosphate, triheptylphosphate, trioctylphosphate, trinonylphosphate, tridecylphosphate, triundecylphosphate, tridodecylphosphate, tritridecylphosphate, tritetradecylphosphate, tripentadecylphosphate, trihexadecylphosphate, dihexylnonylphosphate, didodecyloctylphosphate, octylnonyldecylphosphate, N,N-dibutyldiethylcarbamylphosphoate, tri-iso-butylphosphate, tri-iso-octylphosphate, di-iso-octylphosphate, tri-iso-octylthiophosphate, mono-iso-octyl dihydrogen phosphate, tetrabutyl hypophosphate, tetrabutyl pyrophosphate, n-dodecyl hypophosphite, mono-octylphosphite, dioctylphosphite, diisooctylphenylphosphordithionate, di-n-butylphosphorothioic acid and diheptylphenyl phosphordithionate.

Other suitable esters include butylacetate, acetic acid-i-amyl ester, toluene sulphonic acid methylester, benzoic acid-(2-chloro)-ethyl ester and salicylic acid ethyl ester.

The following are mentioned as examples of oxides: tributylphosphinoxide, triamylphosphinoxide, trihexylphosphinoxide, triheptylphosphinoxide, trioctylphosphinoxide, trinonylphosphinoxide, tridecylphosphinoxide, triundecylphosphinoxide, tridodecylphosphinoxide, triphenylphosphinoxide, tridiphenylphosphinoxide, dibutylamylphosphinoxide, dihexylheptylphosphinoxide, dioctyl laurylphosphinoxide, hexyloctyl laurylphosphinoxide, diphenylbenzylphosphinoxide, dodecylphospholinoxide, tetrahexylmethylene diphosphinoxide, tetra-(2-ethyl)-hexyl-methylene diphosphinoxide, tetraoctylmethylene diphosphinoxide, tetraoctylethylene diphosphinoxide, tetraoctylpropylene diphosphinoxide, tetraoctylbutylene diphosphinoxide, tetraoctylhexylene diphosphinoxide, tetraoctyloctylene diphosphinoxide, tetraoctyldecylene diphosphinoxide, hexaoctyl tributylene tetraphosphinoxide, decaoctylheptabutylene octaphosphinoxide, di-n-amylsulphoxide, di-n-hexylsulphoxide, di-n-heptylsulphoxide, di-n-octylsulphoxide, di-iso-octylsulphoxide, di-n-nonylsulphoxide, di-n-decylsulphoxide, di-n-undecylsulphoxide, didodecylsulphoxide, p-tolylsulphoxide, tri-n-amylaminoxide, tri-n-octylaminoxide, tri-iso-octylaminoxide, tri-n-dodecylaminoxide, tri-n-octylarsinoxide and tri-n-octylphosphinosulphide.

The following are mentioned as examples of amines and quaternary ammonium salts:

octylamine, nonylamine, decylamine, undecylamine, laurylamine, dihexylamine, diheptylamine, dioctylamine, dinonylamine, didecylamine, diundecylamine, dilaurylamine, tetradecylamine, pentadecylamine, hexadecylamine, ditridecylamine, ditetradecylamine, dipentadecylamine, dihexadecylamine, hexylheptylamine, hexyloctylamine, hexylnonylamine, hexylundecylamine, hexyldodecylamine, hexyl laurylamine, hexylhexadecylamine, heptyloctylamine, heptylnonylamine, hexylundecylamine, hexylpentadecylamine, nonyldecylamine, nonyl laurylamine, nonyl tetradecylamine, lauryltetradecylamine, tributylamine, triamylamine, trihexylamine, triheptylamine, trioctylamine, trinonylamine, tridecylamine, triundecylamine, trilaurylamine, tritetradecylamine, tripentadecylamine, trihexadecylamine, dibutylamylamine, butyldiamylamine, dioctylnonylamine, dioctyl laurylamine, hexylheptyloctylamine, tricaprylamine, N-dodecenyltrialkylmethylamines, N-lauryltrialkylmethylamines, methyl diphenylamine, aniline, diphenylamine, o-, m-, p-toluidine and xylidines.

Tributylmethyl ammonium chloride, tripentylmethyl ammonium chloride, trihexylmethyl ammonium chloride, triheptylmethyl ammonium chloride, trioctylmethyl ammonium chloride, trinonylmethyl ammonium chloride, tridecylmethyl ammonium chloride, triundecylmethyl ammonium chloride, trilaurylmethylammonium chloride, tributylethyl ammonium chloride, tripentylethyl ammonium chloride, trihexyl ethyl ammonium chloride, triheptylethyl ammonium chloride, trioctylethyl ammonium chloride, trinonylethyl ammonium chloride, tridecylethyl ammonium chloride, triundecylethyl ammonium chloride, trilaurylethyl ammonium chloride, tributylpropyl ammonium chloride, tripentylpropyl ammonium chloride, trihexylpropyl ammonium chloride, triheptylpropyl ammonium chloride, trioctylpropyl ammonium chloride, trinonylpropyl ammonium chloride, tridecylpropyl ammonium chloride, triundecylpropyl ammonium chloride, trilaurylpropyl ammonium chloride, tetrabutyl ammonium chloride, triamylbutyl ammonium chloride, trihexylbutyl ammonium chloride, triheptylbutyl ammonium chloride, trioctyl butyl ammonium chloride, tributylamyl ammonium chloride, tetraamyl ammonium chloride, trihexylamyl ammonium chloride, trioctylamyl ammonium chloride, tributylhexyl ammonium chloride, triamylhexyl ammonium chloride, tetrahexyl ammonium chloride, triheptylhexyl ammonium chloride, trioctylhexyl ammonium chloride, dibutylamylmethyl ammonium chloride, butyldiamylmethyl ammonium chloride, butyldiamylpropyl ammonium chloride, dioctyllaurylbutyl ammonium chloride, diisobutylphenoxyethoxyethyl dimethylbenzyl ammonium chloride, diisobutylcreoxyethyl dimethylbenzyl ammonium chloride, methyldodecylbenzyl trimethyl ammonium chloride, methyl dodecylxylylene-bis-(trimethyl ammonium chloride), tetrahexyl ammonium iodide, trilauryl monoethyl ammonium nitrate, tricapryl monomethyl ammonium phosphate.

The following are mentioned as examples of trialkyl sulphonium salts: trioctyl sulphonium chloride, trinonylsulphonium chloride, tridecyl sulphonium chloride, triundecyl sulphonium chloride, tridodecyl sulphonium chloride, tritetradecyl sulphonium chloride, trihexadecyl sulphonium chloride and di-decyl-monomethyl sulphonium chloride.

The following are mentioned as examples as ethers: diisobutyl ether, diisoamyl ether, isopropyl ether, bis-(2-butoxyethyl ether), ethylene glycol-bis-(2-cyanoethyl ether) and 1,2,3-tris-(2-cyanoethoxy)-hexane.

The following are mentioned as examples of ketones: n-dibutyl ketone, n-diamyl ketone, n-dihexyl ketone, n-dioctyl ketone, acetyl acetone, acetophenone and benzophenone.

Suitable carboxylic acids include linear or branched, optionally halogen-substituted acids having from 5 to 18 carbon atoms, those having 7 to 16 carbon atoms being preferred. The following are examples: valeric acid, caproic acid, oenanthic acid, caprylic acid, pelargonic acid, capric acid, laurylic acid, myristic acid, palmitic acid, margaric acid, stearic acid, 4-phenyl valeric acid and α-bromolauric acid.

The following are examples of suitable sulphonic acids: dinonyl naphthalene sulphonic acid, m-xylidine sulphonic acid. and di-n-octylthio sulphuric acid.

The following are examples of oximes:
benzyl oxime, 2-hydroxy-5-dodecylbenzophenone oxime, 5,8-diethyl-7-hydroxy-6-dodecanone oxime.

The following are examples of suitable mercaptanes: propyl mercaptane, butyl mercaptane, amyl mercaptane, i-propyl mercaptane, i-butyl mercaptane, i-amyl mercaptane, thiophenol, thio-o-kresol, thio-m-kresol, thio-p-kresol, thio-α-naphthol and thio-β-naphthol.

The following are examples of suitable phosphonates of the formula

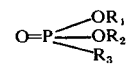

wherein $R_1$, $R_2$ and $R_3$ represent straight chain or branch chain $C_4$–$C_{16}$ alkyl radicals: tributylphosphonate, triamylphosphonate, trihexylphosphonate, triheptylphosphonate, trioctylphosphonate, trinonylphosphonate, tridecylphosphonate, triundecylphosphonate, trilaurylphosphonate, tritetradecylphosphonate, tripentadecylphosphonate and trihexadecylphosphonate.

The following are examples of suitable phosphinates of the formula

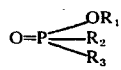

II wherein $R_1$, $R_2$ and $R_3$ represent straight chain or branched chain $C_4$-alkyl radicals:

tributylphosphinate, triamylphosphinate, trihexylphosphinate, triheptylphosphinate, trioctylphosphinate, trinonylphosphinate, tridecylphosphinate, triundecylphosphinate, trilaurylphosphinate, tritetradecylphosphinate, tripentadecylphosphinate and trihexydecylphosphinate.

The following are examples of other compounds which can be used as extractants: 7-dodecyl-8-hydroxy quinoline, 8-hydroxy quinoline, N-benzoylphenol hydroxylamine, i-octylthioglycolate, caprolactam, diphenyl thiocarbazone, tert.-hexyldecylmercaptan, N-hexadecyl N'-phenyl urea, N-oleyl hydroxylamine, tetrachlorohydroquinone, glyoxal-bis-(2-hydroxyanil), phenylbenzohydroxamic acid, 1-[thenoyl-(2')]-3,3,3-trifluoroacetone, 7-[(α-carbomethoxy anilino)benzyl]-hydroxyquinoline, di-dodecyl dithio-oxamide, heptadecano-2,3-dione-dioxime, N-(p-hexadecylphenyl)-salicyl aldimine, N,N',N''-tri-n-hexylphosphorothioic triamide, N-(n-octyl)-4-(2,2,4,4-tetramethylbutyl)-salicyl aldimine, tetraphenylborone, diisobutylcarbinol, 4-sec.-butyl-2-(α-methylbenzyl)-phenol, 4-tert.-butyl-2(α-methyl benzyl)-phenol, bis-(n-octylsulphinyl)-ethanes, bis-(n-octyl sulphinyl)-methanes, N-benzoyl-phenyl hydroxlamines, N,N-dibutyldiethylcarbamyl phosphonates, dibenzoyl methanes, dicyanodiethyl sulphide, dimethyl disulphide, dibutyl diglycol, 2-methyl quinoline, polypropylenoxide, tetra-2-ethylhexyl phosphinium chloride, α-anilin-benzyl-phosphonic mono octyl ester, α-(2-carboxy anilin) benzyl-phosphonic mono octyl ester, tetrabutylmethylendiphosphonate, tetrabutylethylendiphosphonate, acetyl-pivalylmethane, trifluoroacetylpivalylmethane, pentavluoropropanoylpivalylmethane and heptafluorobutanoylpivalylmethane. Furthermore substituted pyrazoles of the formula

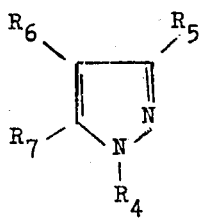

can be used as extractants wherein $R_4$ represents hydrogen, methyl, ethyl, n-butyl, phenyl or benzyl, and $R_5$, $R_6$ and $R_7$ are represented by the equations $R_5 = R_7 = CH_2C_nH_{2n+1}$ respectively $R_6 = C_nH_{2n+1}$ and n represents the integer 3, 4, 5 or 6.

The extractants are generally used in quantities in the range of from 10 to 90 % by weight, based on the total quantity of absorbent, preferably from 40 to 75 % by weight.

The extractants can be used either individually or in a mixture with one another. The following are examples of suitable mixtures:
tributylphosphate/trioctylphosphinoxide;
tributylphosphate/trioctylphosphate;
tributylphosphate/dioctylphosphoric acid;
tributylphosphate/dibutylphosphoric acid;
tributylphosphate/trioctylphosphate/dioctylphosphate;
tributylphosphate/trioctylphosphate/trioctylphosphinoxide;
trioctylamine/trinonylamine;
trioctylamine/trilaurylmethyl ammonium chloride;
trioctylamine/aniline/tetrabutyl ammonium nitrate;
dioctylphosphoric acid/dithizone;
caprylic acid/tri-iso-octylphosphate; and
butylacetate/dibutylether/butanol.

The quantitative ratio of the extractants to one another in mixtures of this kind is not critical and can fluctuate within wide limits.

In the context of the invention, solution promoters are compounds of the kind which represent a solvent both for the extractants and also for the monomeric monovinyl compounds and polyvinyl compounds used. Compounds such as these are optionally halogen-substituted, linear or branched hydrocarbons, cycloaliphatic and aromatic hydrocarbons, and also such compounds as ketones, ethers and alcohols. The following are examples: hexane, heptane, octane, nonane, decane, undecane, dodecane, i-dodecane, petroleum, white oil, paraffin oil, cyclopentane, cyclohexane, methylcyclohexane, dimethylcyclohexane, chloroform, carbon tetrachloride, butyl iodide, 1-bromo-2-bromopropane, 1,1,1-trichloroethane, 1,1,2-trichloroethane, 1,1,2,3,3-pentachloropropane, 1-chlorododecane, benzene, toluene, xylenes, mesitylene, chlorobenzene, iodobenzene, nitrobenzene, diphenylmethane, diphenylethane, naphthalene, di-iso-propylbenzene, n-dibutyl ketone, n-diamyl ketone, n-dihexyl ketone, n-dioctyl ketone, methylisobutyl ketone, acetyl acetone, acetophenone, benzophenone, dipropyl ether, dibutyl ether, di-iso-amyl ether, dihexyl ether, diheptyl ether, di-iso-octyl ether, dioctyl ether, amyl alcohol, i-amyl alcohol, octyl alcohol, dodecyl alcohol, cyclohexanol, and polystyrene solved in styrene or similar solvents as styrene.

The absorbents are generally prepared by dissolving the monomeric monovinyl and polyvinyl compounds in the extractant, in the mixture of extractants or in the solution of an extractant in a solution promoter; adding a polymerisation catalyst and polymerising the resulting solution by a conventional technique.

To prepare bead-form absorbents, a mixture consisting of the monomeric monovinly and polyvinly compounds, the catalyst and the extractant is generally introduced into a mixture of water and a suspension stabiliser, the resulting mixture is then dispersed by stirring into droplets. The suspension stabilisers are known compounds, the following being examples: methyl cellulose, hydroxyethyl cellulose, carboxymethyl cellulose, gelatin, gum arabic, styrene maleic acid anhydride, polyvinyl alcohol, bentonite, sodium lauryl sulphate and Mersolats.

All free radical generating catalysts are useful in accordance with the present invention. Typical examples include: acetyl peroxide, benzoyl peroxide, tert.-butyl hydroxide, cumene peroxide, lauryl peroxide, azo-bis-isobutyronitrile, methylethyl ketone peroxide, tetralin peroxide and persulphates. The catalysts are generally used in quantities of from 0.01 to 4 % by weight, preferably from 0.2 to 2 % by weight based on the total quantity of monomer.

The temperature at which polymerisation is carried out is generally in the range of from 30° to 150°C and preferably in the range of from 60° to 95°C. Temperatures in excess of 100°C necessitate the presence of external pressure. Accordingly, the polymerisation reaction is not confined to normal pressure and can also be carried out under elevated pressure.

Figure 2:
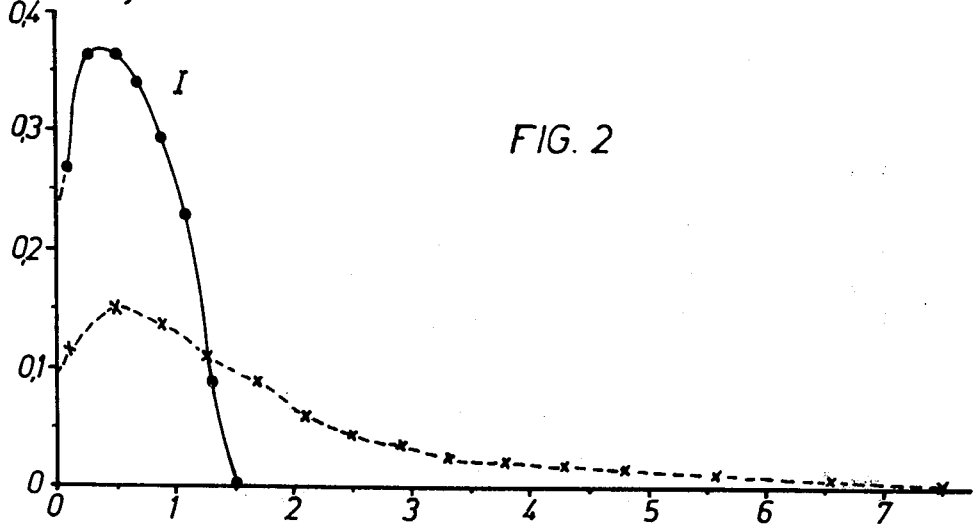

The absorbents obtained by the process according to the invention give off hardly and extractant to the mobile phase. The elution curves show virtually no tail formation. The accompanying FIGS. 1 and 2 are comparisons of the elution curves of absorbents produced in accordance with the invention with those obtained in the elution of conventional absorbents. The absorbents used in FIGS. 1 and 2 for comparison purposes were obtained by conventional methods in accordance with Beranova H., Novak M., Coll. Zech. Chem. Comm. 30 (1073–81 (1965), by impregnating 100 g of a macroporous copolymer of 8 % of divinylbenzene and 92 % of styrene with 67 ml of tri-n-butylphosphate (FIG. 1) and by impregnating this macroporous copolymer of 25 % of divinyl benzene and 75 % of styrene with 150 ml of tri-n-butylphosphate (FIG. 2), while the absorbents prepared by the process according to the invention, were produced in accordance with the specification of Example 1, by copolymerising 36.8 % of styrene, 3.2 % of divinyl benzene and 60 % of tri-n-butylphosphate (FIG. 1) and 30 % of styrene, 10 % of divinyl benzene in the presence of 60 % of tri-n-butylphosphate (FIG. 2). Batches of 100 ml of the absorbents were introduced into a 2.4 cm diameter, 24 cm long column and 100 ml of an uranyl nitrate solution having a concentration of 100 g/l in 3 n $HNO_3$ poured over them as the mobile phase.

The charged absorbents were then washed with 150 ml 3 N $HNO_3$ and eluted with water. The curves denoted by the reference I in FIGS. 1 and 2 are the elution curves of the absorbents prepared in accordance with the invention. It can clearly be seen from these curves that the tail formation characterising the elution curves of conventional absorbents is substantially eliminated in the case of the absorbents produced in accordance with the invention. The curves relating to the absorbents produced in accordance with the invention also show a distinct increase in capacity.

EXAMPLE 1

A solution of 13.4 parts of 60.8% divinyl benzene, 136.6 parts of styrene, 1.5 parts of benzoyl peroxide and 350 parts of tri-n-butylphosphate, was introduced into a starting mixture of 1500 parts of water and 130 parts of a 2.5% methyl cellulose solution. The mixture was heated with stirring for 3 hours to a temperature of 80°C, left at this temperature for a period of 10 hours and then heated for 1 hour to 90°C. After cooling, the aqueous phase was separated off and the resulting bead polymer was briefly washed with water.

EXAMPLE 2

The procedure was as described in Example 1, except that a solution of 32.9 parts of 60.8% divinyl benzene, 167.1 parts of vinyl toluene, 2 parts of benzoyl peroxide and 300 parts of tri-n-butyl phosphate were added to the starting mixture.

EXAMPLE 3

The procedure was as described in Example 1, except that 49.3 parts of 60.8% divinyl benzene, 150.7 parts of styrene, 3 parts of azo-bis-isobutyronitrile and 300 parts of dodecylamine were added to the starting mixture.

EXAMPLE 4

The procedure was as described in Example 1, except that 65.7 parts of 60.8% divinyl benzene, 134.3 parts of styrene, 2 parts of azo-bis-isobutyronitrile and 150 parts of chlorododecane and 150 parts of phosphoric acid-bis(2-ethylhexylester) were added to the starting mixture.

EXAMPLE 5

The procedure was as described in Example 1, except that 65.7 parts of 60.8% divinyl benzene, 134.3 parts of styrene, 3 parts of azo-bis-isobutyronitrile, 240 parts of 1-chlorododecane and 60 parts of bis-(2-ethylhexyl)-amine were added to the starting mixture.

EXAMPLE 6

The procedure was as described in Example 1, except that 32.8 parts of 60.8% divinyl benzene, 67.2 parts of styrene, 1 part of azo-bis-isobutyronitrile and 150 parts of tricaprylamine were added to the starting mixture.

EXAMPLE 7

The procedure was as described in Example 1, except that 142.6 parts of 56.1% divinyl benzene, 57.4 parts of styrene, 6 parts of azo-bis-isobutyronitrile and 300 parts of 9-amino-heptadecane were added to the starting mixture.

EXAMPLE 8

The procedure was as described in Example 1, except that 178.3 parts of 60.8% divinyl benzene, 21.7 parts of styrene, 6 parts of azo-bis-isobutyronitrile and 300 parts of bis-(2-ethylhexyl)-amine were added to the starting mixture.

EXAMPLE 9

The procedure was as described in Example 1, except that 164.4 parts of 60.8% of divinyl benzene, 35.6 parts of styrene, 6 parts of azo-bis-isobutyronitrile and 300 parts of 2-ethylhexylamine were added to the starting mixture.

EXAMPLE 10

The procedure was as described in Example 1, except that 123.9 parts of 60.5% divinyl benzene, 26.1 parts of styrene, 1.5 parts of benzoyl peroxide and 350 parts of tributyl phosphate were added to the starting solution.

EXAMPLE 11

A solution of 21.7 parts of 96.8% divinyl benzene, 8.3 parts of styrene, 0.3 part of benzoyl peroxide and 70 parts of tri-n-butylphosphate, was added to a starting mixture of 307 parts of water and 27 parts of 2.5% methyl cellulose solution. The resulting mixture was heated with stirring for 3 hours to a temperature of 80°C, left at this temperature for a period of 15 hours and then heated for 1 hour to 90°C. After cooling, the aqueous phase is separated off and the resulting bead polymer was washed briefly with water.

EXAMPLE 12

A solution of 124.4 parts of 95.5% divinyl benzene, 75.6 parts of styrene, 2 parts of benzoyl peroxide and 150 parts of caprylic acid and 150 parts of phosphoric acid-bis-(2-ethylhexyl)-ester was added to a starting mixture of 1000 parts of water and 87 parts of a 2.5% methyl cellulose solution. The mixture was heated with stirring for 3 hours to a temperature of 80°C, left at this temperature for 10 hours and then heated for 1 hour to 90°C. After cooling, the aqueous phase was separated off and the resulting bead polymer washed briefly with water.

EXAMPLE 13

30 parts of 96.8% divinyl benzene, 70 parts of tributyl phosphate and 0.7 part of benzoyl peroxide were added to a starting mixture of 326.4 parts of water and 13.6 parts of a 2.5% methyl cellulose solution. The mixture was heated with stirring for 3 hours to a temperature of 80°C, left at this temperature for a period of 10 hours and then heated for 1 hour to 90°C. After cooling, the bead polymer was separated off from the aqueous phase and washed briefly with water.

EXAMPLE 14

The procedure was as described in Example 1, except that 42.6 parts of 52.8% divinyl benzene, 407.4 parts of styrene, 4.5 parts of azo-bis-isobutyronitrile, 25 parts of methyltricapryl-ammonium chloride and 25 parts of chlorododecane were added to the starting mixture.

EXAMPLE 15

The procedure was as described in Example 1, except that 127.1 parts of 52.8% divinyl benzene, 172.9 parts of styrene, 4 parts of azo-bis-isobutyronitrile and 100 parts of tributylamine were added to the starting mixture.

EXAMPLE 16

The procedure was as described in Example 1, except that 33.5 parts of 96.8% divinyl benzene, 16.5 parts of styrene, 0.5 parts of benzoyl peroxide, 360 parts of 1,1,2,3,3-pentachloropropane and 90 parts of trioctyl-phosphate were added to the starting mixture.

EXAMPLE 17

A solution consisting of 243.9 parts of 61.5% divinyl benzene, 56.1 parts of styrene, 6 parts of azo-bis-isobutyronitrile and 200 parts of 2,2-dicyano-diethyl sulphide was added to a starting mixture consisting of 500 parts of water, 130 parts of 2.5% methyl cellulose solution. The mixture was heated with stirring for 6 hours to a temperature of 80°C, left at this temperature for a period of 7 hours and then heated for 3 hours to 90°C. After cooling, the resulting bead polymer was separated off from the aqueous phase and washed briefly with water.

EXAMPLE 18

A solution consisting of 155 parts of 96.8% divinyl benzene, 45 parts of styrene, 2 parts of azo-bis-isobutyronitrile and 300 parts of chloroform was added to a solution of 500 parts of water and 130 parts of 2.5% methyl cellulose solution. The mixture was quickly heated with stirring to a temperature of 60°C and left at this temperature for a period of 15 hours. After cooling, the bead polymer was separated off from the aqueous phase and washed briefly with water.

EXAMPLE 19

A solution of 51.7 parts of 96.8% divinyl benzene, 48.3 parts of styrene, 1 part of benzoyl peroxide, 200 parts of white oil, 38.6 parts of butanol having a density of 0.810 g/ml, 36.8 parts of dibutylether having a density of 0.773 g/ml. and 124.6 parts of butyl acetate having a density of 0.875 g/ml., was added to a starting mixture consisting of 500 parts of water and 130 parts of 2.5% methyl cellulose solution. The resulting mixture was heated with stirring for 4 hours to a temperature of 80°C, left at this temperature for 9 hours and then heated for 3 hours to 90°C. After cooling, the resulting bead polymer was separated off from the aqueous phase and washed briefly with water.

EXAMPLE 20

A solution of 130.1 parts of 61.5% divinyl benzene, 269.9 parts of styrene, 4 parts of benzoyl peroxide, 20 parts of tri-n-butylphosphate and 80 parts of n-octane was added to a starting mixture of 500 parts of water and 130 parts of 2.5% methylcellulose solution. The mixture was heated with stirring for 4 hours to a temperature of 85°C, left at this temperature for a period of 10 hours and then heated for 1 hour to 90°C. The resulting bead polymer was separated off from the aqueous phase and washed briefly with water.

EXAMPLE 21

A solution consisting of 216.9 parts of 96.8% divinyl benzene, 83.1 parts of styrene, 3 parts of benzoyl peroxide, 160 parts of tri-n-butyl phosphate and 40 parts of 1-oxo-1-dodecylphospholine, was added to 1500 parts of saturated sodium sulphate solution. The mixture was heated with stirring for 3 hours to 85°C, left at this temperature for 10 hours and then heated for 1 hour to 95°C. After cooling, the resulting bead polymer was separated off from the aqueous phase and washed briefly with water.

EXAMPLE 22

A solution consisting of 289.3 parts of 96.8% divinyl benzene, 110.7 parts of styrene, 4 parts of azo-bis-isobutyronitrile and 100 parts of aniline, was added to a starting mixture consisting of 1500 parts of water and 130 parts of 2.5% methyl cellulose solution. The mixture was heated with stirring for 5 hours to a temperature of 81°C, left at this temperature for a period of 10 hours and then heated for 1 hour to 90°C. After cooling, the resulting bead polymer was separated off from the aqueous phase and washed briefly with water.

EXAMPLE 23

A solution of 62 parts of 96.8% divinyl benzene, 38 parts of styrene, 1 part of benzoyl peroxide, 200 parts of phosphoric acid-bis-(2-ethylhexyl)-ester, 100 parts of white oil and 100 parts of 1,1,2,3,3-pentachloropropane, was added to a starting mixture of 1500 parts of water and 130 parts of 2.5% methyl cellulose solution. The mixture was heated with stirring for 1 hour to a temperature of 80°C, left at this temperature for a period of 12 hours and then heated for 1 hour to 90°C. After cooling, the bead polymer was separated off from the aqueous phase and washed briefly with water.

EXAMPLE 24

A solution consisting of 75.7 parts of 52.8% divinyl benzene, 24.3 parts of styrene, 1 part of azo-bis-isobutyronitrile and 380 parts of dimethyl disulphide and 20 parts of polystyrene, was added to a starting mixture of 500 parts of water and 130 parts of 2.5% methyl cellulose solution. The mixture was heated with stirring for 1.5 hours to a temperature of 70°C, left at this temperature for 10 hours and then heated for 1 hour to 90°C. After cooling, the bead polymer obtained was separated off from the aqueous phase and washed briefly with water.

EXAMPLE 25

A solution consisting of 151.4 parts of 52.8% divinyl benzene, 48.6 parts of styrene, 2 parts of benzoyl peroxide and 300 parts of 1-bromobutane, was added to a starting mixture consisting of 1500 parts of water and 130 parts of 2.5% methyl cellulose solution. The mixture was heated with stirring for 4 hours to a temperature of 80°C, left at this temperature for a period of 7 hours and then heated for 2 hours to 90°C. After cooling, the resulting bead polymer was separated off from the aqueous phase and washed briefly with water.

EXAMPLE 26

A solution consisting of 151.4 parts of 52.8% divinyl benzene, 48.6 parts of styrene, 2 parts of benzoyl peroxide and 300 parts of diethyl sulphate, was added to a starting mixture of 1500 parts of water and 130 parts of 2.5% methyl cellulose solution. The mixture was heated with stirring for 2 hours to a temperature of 70°C and then for 1 hour to 80°C, left at 80°C for a period of 15 hours and then heated for 1 hour to 90°C. After cooling, the resulting bead polymer was separated off from the aqueous phase and washed briefly with water.

EXAMPLE 27

A solution consisting of 113.5 parts of 52.8% divinyl benzene, 86.5 parts of styrene, 2 parts of benzoyl peroxide and 300 parts of dipropylketone, was added to a starting mixture of 1500 parts of water and 130 parts of 2.5% methyl cellulose solution. The mixture was heated with stirring for 6 hours to a temperature of 80°C, left at this temperature for a period of 9 hours and then heated for 2 hours to 90°C. After cooling, the bead polymer was separated off from the aqueous phase and washed briefly with water.

EXAMPLE 28

A solution of 240.6 parts of 52.8% divinyl benzene, 47.4 parts of styrene, 0.9 parts of benzoyl peroxide and 210 parts of dibutyl diglycol, was added to a starting mixture of 1500 parts of water and 130 parts of 2.5% methyl cellulose solution. The mixture was heated with stirring for 2 hours to 85°C, left at this temperature for 12 hours and then heated for 2 hours to 95°C. After cooling, the resulting bead polymer was separated off from the aqueous phase and washed briefly with water.

EXAMPLE 29

A solution of 25.5 parts of 52.3% divinyl benzene, 41.2 parts of styrene, 0.7 parts of benzoyl peroxide, 80 parts of tri-n-butyl phosphate and 20 parts of trioctyl phosphinoxide, was added to a starting mixture of 511 parts of water and 44 parts of 2.5% methyl cellulose solution. The mixture was heated with stirring for 2.5 hours to 80°C, left at this temperature for a period of 10 hours, and then heated for 1 hour to 90°C. After cooling, the resulting bead polymer was separated off from the aqueous phase and washed briefly with water.

EXAMPLE 30

A solution of 53.5 parts of 52.3% divinyl benzene, 296.5 parts of styrene, 2.5 parts of benzoyl peroxide, 146 parts of methylisobutylketone and 4 parts of 1-[thenoyl-(2)]-3,3,3-trifluoroacetone, was added to a starting mixture consisting of 1500 parts of water and 130 parts of 2.5% methyl cellulose solution. The resulting mixture was heated with stirring for 4 hours to a temperature of 85°C, left at this temperature for a period of 8 hours and then heated for 2 hours to 95°C. After cooling, the aqueous phase was separated off and the bead polymer obtained was washed briefly with water.

EXAMPLE 31

A solution of 50.9 parts of 52.8% divinyl benzene, 2.9 parts of styrene, 0.5 part of azo-bis-isobutyronitrile, 80.3 parts of methylisobutylketone and 0.5 parts of didodecyldithio-oxamide, was added to a starting mixture consisting of 500 parts of water and 40 parts of 2.5% methyl cellulose solution. The resulting mixture was heated with stirring for 7 hours to a temperature of 80°C, left at this temperature for 9 hours and then heated for 3 hours to a temperature of 95°C. After cooling, the bead polymer was separated off from the aqueous phase and washed briefly with water.

EXAMPLE 32

A solution of 33.1 parts of 52.8% divinyl benzene, 36.9 parts of styrene, 0.7 parts of benzoyl peroxide, 100 parts of methylisobutylketone and 5 parts of 8-oxoquinoline, was added to a starting mixture of 500 parts of water and 40 parts of 2.5% methyl cellulose solution. The mixture was heated for 4 hours with stirring to a temperature of 85°C, left at this temperature for a period of 13 hours and then heated for 1 hour to 90°C. After cooling, the aqueous phase was separated off and the bead polymer thus obtained was briefly washed with water.

EXAMPLE 33

A solution consisting of 32.7 parts of 52.8% divinyl benzene, 36.6 parts of styrene, 0.7 parts of benzoyl peroxide, 100 parts of methylisobutyl ketone and 0.38 parts of 7-[α-(carbomethoxyaniline)-benzyl]-hydroxy quinoline, was added to a starting mixture of 500 parts of water and 40 parts of 2.5% methyl cellulose solution. The mixture was heated with stirring for 3 hours to a temperature of 80°C, left at this temperature for 12 hours and then heated for 1 hour to a temperature of 90°C. After cooling, the aqueous phase was separated off and the bead polymer thus obtained was washed briefly with water.

EXAMPLE 34

A solution of 57.4 parts of 52.3% divinyl benzene, 242.6 parts of styrene, 3 parts of benzoyl peroxide, 170 parts of white oil and 30 parts of phosphoric acid-bis-(2-ethylhexyl)-ester was added to a starting mixture of 1500 parts of water and 130 parts of 2.5% methyl cellulose solution. The mixture was heated for 2.5 hours to 83°C, left at this temperature for a period of 12 hours and then heated for 1 hour to 95°C. After cooling, the bead polymer thus obtained is separated off from the aqueous phase and washed briefly with water.

EXAMPLE 35

A solution of 57.6 parts of 52.3% divinyl benzene, 202.4 parts of styrene, 2.5 parts of benzoyl peroxide, 62.5 parts of polypropylene oxide, 125 parts of petroleum and 62.5 parts of octanol, was added to a starting mixture of 1500 parts of water and 130 parts of 2.5% methyl cellulose solution. The resulting mixture was heated with stirring for 2 hours to 80°C, left at this temperature for 13 hours and then heated for 1 hour to a temperature of 90°C. The resulting bead polymer was separated off from the aqueous phase and washed briefly with water.

EXAMPLE 36

A solution consisting of 19.1 parts of 52.3% divinyl benzene, 80.9 parts of styrene, 1 part of benzoyl peroxide and 400 parts of acetic acid isoamyl ester, was added to a starting mixture consisting of 1500 parts of water and 130 parts of 2.5% methyl cellulose solution. The resulting mixture was heated with stirring for 4 hours to 80°C, left at this temperature for a period of 10 hours and then heated for 1 hour to 90°C. After cooling, the aqueous phase was separated off and the resulting bead polymer washed briefly with water.

EXAMPLE 37

A solution of 133.8 parts of 52.3% divinyl benzene, 216.2 parts of styrene, 3.5 parts of azo-bis-isobutyronitrile, 75 parts of trinonylamine and 75 parts of 1,1,2,2-tetrachloroethane, was added to a starting mixture of 1500 parts of water and 130 parts of 2.5% methylcellulose solution. The resulting mixture was heated with stirring for 7 hours to 80°C, left at this temperature for 10 hours and then heated for 1 hour to 90°C. The resulting bead polymer was separated off from the aqueous phase after cooling and washed briefly with water.

EXAMPLE 38

A solution of 57.4 parts of 52.3% divinyl benzene, 42.6 parts of styrene, 1 part of azo-bis-isobutyronitrile and 400 parts of 2-methylquinoline, was added to a starting mixture of 1500 parts of water and 130 parts of 2.5% methyl cellulose solution. The resulting mixture was heated with stirring for 4 hours to 80°C, left at this temperature for 11 hours and then heated for 2 hours to 90°C. After cooling, the aqueous phase was separated off and the bead polymer thus obtained was washed briefly with water.

EXAMPLE 39

A solution of 94.1 parts of styrene, 305.9 parts of 52.3% divinyl benzene, 4 parts of benzoyl peroxide and 100 parts of toluene sulphonic acid-(4)-methylester, was added to a starting mixture consisting of 1500 parts of water and 130 parts of 2.5% methyl cellulose solution. The resulting mixture was heated with stirring for 5 hours to a temperature of 80°C, left at this temperature for a period of 11 hours and then heated for 2 hours to 90°C. After cooling, the aqueous phase was separated off and the bead polymer thus obtained was washed briefly with water.

EXAMPLE 40

A solution of 267.7 parts of 52.3% divinyl benzene, 82.3 parts of styrene, 3.5 parts of benzoyl peroxide and 150 parts of methylcyclohexylacetate, was added to a starting mixture consisting of 1500 parts of water and 130 parts of 2.5% methyl cellulose solution. The resulting mixture was heated with stirring for 6 hours to 80°C, left at this temperature for 11 hours and then heated for 2 hours to 90°C. After cooling, the bead polymer thus obtained was separated off from the aqueous phase and washed briefly with water.

EXAMPLE 41

A solution of 191.2 parts of 52.3% divinyl benzene, 58.8 parts of styrene, 2.5 parts of benzoylperoxide and 250 parts of benzoic acid-(2-chloroethylester), was added to a starting mixture consisting of 1500 parts of water and 130 parts of 2.5% methyl cellulose solution. The resulting mixture was heated with stirring for 3 hours to 80°C, left for 5 hours at this temperature and then heated for 5 hours to 90°C. After cooling, the aqueous phase was separated off and the bead polymer thus obtained was washed briefly with water.

EXAMPLE 42

A solution of 97.6 parts of 61.5% divinyl benzene, 52.4 parts of styrene, 1.5 parts of benzoyl peroxide and 350 parts of diisopropylether, was added to a starting mixture consisting of 1500 parts of water and 130 parts of 2.5% methyl cellulose solution. The resulting mixture was heated for 4 hours to 80°C, left at this temperature for 5 hours and then heated for 5 hours to 90°C. After cooling, the aqueous phase was separated off and the bead polymer thus obtained was washed briefly with water.

EXAMPLE 43

A solution of 352.5 parts of 61.5% divinyl benzene, 74.8 parts of styrene, 4 parts of benzoyl peroxide and 100 parts of salicylic acid ethylester, was added to a starting mixture consisting of 1500 parts of water and 130 parts of 2.5% methyl cellulose solution. The resulting mixture was heated with stirring for 5 hours to 80°C, left at this temperature for 5 hours and then heated for 5 hours to 90°C. After cooling, the aqueous phase was separated off and the bead polymer thus obtained was washed briefly with water.

EXAMPLE 44

A solution consisting of 284.5 parts of 61.5% divinyl benzene, 65.6 parts of styrene, 3.5 parts of azo-bis-isobutryonitrile and 150 parts of methyl-diphenylamine, was added to a starting mixture of 1500 parts of water and 130 parts of 2.5% methyl cellulose solution. The resulting mixture was heated for 2 hours to 70°C, left at this temperature for 8 hours and then heated for 4 hours to 90°C. After cooling, the bead polymer thus obtained was separated off from the aqueous phase and washed briefly with water.

EXAMPLE 45

A solution of 200.8 parts of 52.3% divinyl benzene, 149.2 parts of styrene, 6 parts of benzoyl peroxide, 75 parts of 2-hydroxy-5-dodecylbenzophenoxime and 75 parts of white oil, was added to a starting mixture consisting of 1500 parts of water and 130 parts of 2.5% methyl cellulose solution. The mixture was heated with stirring for 4 hours to a temperature of 85°C, left at this temperature for 10 hours and then heated for 1 hour to 95°C. After cooling, the aqueous phase was separated off and the bead polymer thus obtained was washed briefly with water.

EXAMPLE 46

A solution of 172.1 parts of 52.3% divinyl benzene, 127.9 parts of styrene, 6 parts of benzoyl peroxide, 100 parts of 7-dodecyl-8-hydroxyquinoline and 100 parts of white oil, was added to a starting mixture consisting of 1500 parts of water and 130 parts of 2.5% methyl cellulose solution. The resulting mixture was heated with stirring for 5 hours to 90°C, and left at this temperature for 12 hours. After cooling, the aqueous phase was separated off and the bead polymer thus obtained was washed briefly with water.

EXAMPLE 47

A solution of 143.4 parts of 52.3% divinyl benzene, 106.6 parts of styrene, 2.5 parts of benzoyl peroxide, 125 parts of 7-octyl-8-hydroxyquinoline and 125 parts of isododecane was added to a starting mixture consisting of 1500 parts of water and 130 and 2.5% methyl cellulose solution. The resulting mixture was heated with stirring for 6 hours to a temperature of 85°C, left at this temperature for 10 hours and then heated for 1 hour to 95°C. The bead polymer thus obtained was separated off from the aqueous phase and washed briefly with water.

EXAMPLE 48

A solution of 86.1 parts of 52.3% divinyl benzene, 60.7 parts of styrene, 3.2 parts of butyl acrylate, 1.5 parts of benzoyl peroxide, 210 parts of petroleum, 52.5 parts of dodecanol and 87.5 parts of a mixture of 2-hydroxy-5-dodecylbenzophenonoxime and 5,8-diethyl-7-hydroxy-6-dodecanonoxime, was added to a starting mixture consisting of 1500 parts of water and 130 parts of 2.5% methylcellulose solution. The resulting mixture was heated with stirring for 3 hours to 80°C, left at this temperature for 11 hours and then heated for 2 hours to 90°C. The bead polymer thus obtained was separated off from the aqueous phase after cooling and washed briefly with water.

EXAMPLE 49

A solution of 97.1 parts of 61.8% divinyl benzene, 202.9 parts of styrene, 3 parts of benzoyl peroxide and 200 parts of tri-n-butylphosphate, was added to a starting mixture consisting of 1200 parts of water and 300 parts of 2.5% methyl cellulose solution in an autoclave. The resulting mixture was heated with stirring to 80°C, left at this temperature for 1 hour, heated for 1 hour to 120°C and left at this temperature for 1 hour. During this time, the pressure rose to 4 atms. After cooling, the bead polymer was separated off from the aqueous phase and washed briefly with water.

EXAMPLE 50

A solution of 72.7 g of 61.8% divinyl benzene, 77.3 g of styrene, 1.5 g of azo-bis-isobutyronitrile and 350 g of tributylamine, was added to a starting mixture consisting of 1200 ml. of water and 300 ml. of 2.5% methyl cellulose solution in an autoclave. The resulting mixture was heated with stirring to 70°C, left at this temperature for 1 hour, then heated for 1.5 hours to 140°C and kept at this temperature for about 30 minutes during which time the pressure rose to 5 atms. After cooling, the bead polymer thus obtained was separated off from the aqueous phase and washed briefly with water.

EXAMPLE 51

A solution of 32,9 parts of 60,8% divinyl benzene, 167.1 parts of vinyl toluene, 2 parts of azo-bis-isobutyronitrile and 300 parts of n-amyl mercaptane, was added to a starting mixture consisting of 1500 parts of water and 130 parts of 2,5% methyl cellulose solution. The resulting mixture was heated with stirring for 3 hours to 80°C, left at this temperature for 10 hours and then heated for 1 hour to 90°C. The bead polymer thus obtained was separated off from the aqueous phase after cooling and washed briefly with water.

EXAMPLE 52

A solution of 94,6 parts of 52,9% divinyl benzene, 105,4 parts of methacryl acid methyl ester, 2 parts of benzoyl peroxide and 300 parts of tri-n-butyl phosphate was added to a starting mixture consisting of 1500 parts of water and 130 parts of 2,5% methyl cellulose solution. The mixture was heated with stirring for 3 hours to a temperature of 80°C, left at this temperature for 10 hours and then heated for 1 hour to 90°C. After cooling, the aqueous phase was separated off and the bead polymer thus obtained was washed briefly with water.

EXAMPLE 53

A solution of 47,3 parts of 52,9% divinyl benzene, 52,7 parts of acrylic acid butyl ester, 1 part of benzyl peroxide and 400 parts of tri-n-butyl phosphate was added to a starting mixture consisting of 1500 parts of water and 130 parts of 2,5% methyl cellulose solution. The resulting mixture was heated with stirring for 3 hours of 80°C, left at this temperature for 10 hours and then heated for 1 hour to 90°C. The bead polymer thus obtained was separated off from the aqueous phase after cooling and then washed briefly with water.

We claim:
1. A process for the production of an absorbent based on a synthetic resin which comprises (1) adding an extractant, a mixture of extractants or a solution of an extractant in a solution promoter to a mixture comprising a monomeric monovinyl compound and a monomeric polyvinyl compound, (2) polymerizing the resulting mixture in the presence of a free radical catalyst; the extractant, the mixture of extractants and the solution of the extractant in the solution promoter being solvents for the monomeric monovinyl or polyvinyl compound but not for the resulting polymer, and (3) recovering a copolymer in which the extractant or extractant mixture is included in the polymer, said extractant, mixture of extractants or the solution of the extractant in the solution promoter being used in a quantity of from 10 to 90% by weight, based on the total quantity of absorbent and said polyvinyl compound being employed in a quantity of from 5 to 70% by weight, based on the total quantity of monomers.

2. The process as claimed in claim 1 wherein the monovinyl compound is styrene and the polyvinyl compound is divinyl benzene.

3. The process as claimed in claim 1 wherein the extractant is an ester.

4. The process as claimed in claim 3 wherein the ester is a phosphorus acid ester.

5. The process as claimed in claim 1 wherein the extractant is a primary, secondary or tertiary amine.

6. The process as claimed in claim 1 wherein the extractant is a sulphide.

7. The process as claimed in claim 1 wherein the extractant is a sulphoxide.

8. The process as claimed in claim 1 wherein the extractant is a phosphinoxide.

9. The process as claimed in claim 1 wherein the extractant is a phosphonate.

10. The process as claimed in claim 1 wherein the extractant is a diphosphonate.

11. The process as claimed in claim 1 wherein the extractant is a phosphinate.

12. The process as claimed in claim 1 wherein the extractant is a sulphonium salt.

13. The process as claimed in claim 1 wherein the extractant is a ketone.

14. The process as claimed in claim 1 wherein the extractant is an ether.

15. The process as claimed in claim 1 wherein the extractant is a carboxylic acid.

16. The process as claimed in claim 4 wherein the extractant is tri-n-butylphosphate.

17. The process as claimed in claim 4 wherein the extractant is a tri-hexylphosphonate.

18. The process as claimed in claim 8 wherein the extractant is trioctyl phosphinoxide.

19. The process as claimed in claim 4 wherein the extractant is phosphoric acid-bis-(2-ethylhexyl)-ester.

20. The process as claimed in claim 7 wherein the extractant is dioctyl sulphoxide.

21. The process as claimed in claim 12 wherein the extractant is tridecyl sulphonium chloride.

22. The process as claimed in claim 1 wherein the extractant, the mixture of extractants or the solution of the extractant in a solution promoter is used in a quantity of from 40 to 75% by weight, based on the total quantity of monomers.

23. The process as claimed in claim 1, wherein polymerization is carried out at a temperature of from 30° to 150°C.

24. An absorbent for use in extraction chromatography comprising a copolymer of a monovinyl compound and a polyvinyl compound which has an extractant included in the copolymer, said extractant being a solvent for the monomeric monovinyl compound or polyvinyl compound but not for the resulting copolymer, said extractant being used in a quantity of from 10 to 90% by weight, based on the total quantity of monomers. absorbent and said polyvinyl compound being employed in a quantity of from 5 to 70% by weight, based on the total quantity of monomers.

25. Absorbent suitable for use in extraction chromatography comprising a copolymer of monovinyl compound and a polyvinyl compound which has an extractant, a mixture of extractants or a solution of an extractant in a solution promoter included in the copolymer, said extractant, mixture of extractants or solution of extractant in a solution promoter being a solvent for the monomeric monovinyl compound or polyvinyl compound but not for the resulting copolymer and being present in a quantity of from 10 to 90% by weight, based on the total quantity of absorbent and said polyvinyl compound being present in said copolymer in an amount of from 5 to 70% by weight, based on the total quantity of monomers therein.

26. The absorbent of claim 25 wherein tri-n-butylphosphate is the extractant.

27. The absorbent of claim 25, wherein phosphoric acid-bis-(2-ethylhexyl)-ether is the extractant.

28. The absorbent of claim 25 wherein dioctyl sulphoxide is the extractant.

29. The absorbent of claim 25 wherein trioctylphosphinoxide is the extractant.

30. The product of claim 25 wherein the monovinyl compound is styrene and the polyvinyl compound is divinylbenzene.

31. The product of claim 25 wherein the extractant is included in the copolymer in the form of a mixture of extractants, or as a solution of the extractant in a solution promoter.

32. The absorbent of claim 25 wherein said monovinyl compound is styrene, vinyl toluene, methacrylic acid ester or acrylic acid ester and said polyvinyl compound is divinylbenzene.

33. The process as claimed in claim 1 wherein said monovinyl compound is styrene, vinyl toluene, methacrylic acid ester or acrylic acid ester and said polyvinyl compound is divinylbenzene.

* * * * *